United States Patent
D'Aniello et al.

(10) Patent No.: US 11,057,233 B1
(45) Date of Patent: Jul. 6, 2021

(54) USING DATA ANALYSIS TO OPTIMIZE MICROPHONE ENABLEMENT IN A GROUP ELECTRONIC COMMUNICATION

(71) Applicant: International Business Machines Corporation, Armonk, NY (US)

(72) Inventors: Alfonso D'Aniello, Gragnano (IT); Alessandro Ghezzi, Rome (IT); Andrea Tortosa, Rome (IT); Damiano Bassani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/810,119

(22) Filed: Mar. 5, 2020

(51) Int. Cl.
| | |
|---|---|
| *H04L 12/18* | (2006.01) |
| *H04L 29/06* | (2006.01) |
| *G06F 40/20* | (2020.01) |
| *G10L 25/60* | (2013.01) |
| *G06K 9/62* | (2006.01) |

(52) U.S. Cl.
CPC .......... *H04L 12/1827* (2013.01); *G06F 40/20* (2020.01); *G06K 9/6218* (2013.01); *G06K 9/6256* (2013.01); *G10L 25/60* (2013.01); *H04L 65/403* (2013.01); *H04L 65/60* (2013.01); *H04L 65/80* (2013.01)

(58) Field of Classification Search
CPC ... H04L 12/1827; H04L 65/80; H04L 65/403; H04L 65/60; G10L 25/60; G06F 40/20; G06K 9/6256; G06K 9/6218
See application file for complete search history.

(56) References Cited

U.S. PATENT DOCUMENTS

| | | | | |
|---|---|---|---|---|
| 9,083,822 | B1* | 7/2015 | Basart | H04M 15/06 |
| 9,215,543 | B2* | 12/2015 | Sun | H04R 29/008 |
| 9,967,520 | B1* | 5/2018 | Rensburg | H04L 12/1822 |
| 10,374,816 | B1* | 8/2019 | Leblang | H04L 12/1822 |
| 2011/0091029 | A1* | 4/2011 | LeBlanc | H04M 3/562 |
| | | | | 379/202.01 |

(Continued)

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Michael C Lai
(74) *Attorney, Agent, or Firm* — Erik C. Swanson

(57) ABSTRACT

Optimizing input component enablement for a plurality of communication devices that have input components associated with at least one of a group of meeting participants. At least one of the participants has an identification attribute in an electronic group meeting. A computer receives audio input from input components and analyzes qualitative attributes and content of the audio input to provide a set of quality metrics and a focus concept. The metrics are assessed to determine whether the audio input exceeds quality thresholds, and the focus concept is compared to participant identification attributes. A computer system makes determinations based on these assessments to selectively place input components that provide input with desired quality or which are associated with participants having identification attributes that correspond to the focus concept into an active speaking mode.

20 Claims, 10 Drawing Sheets

(56) References Cited

U.S. PATENT DOCUMENTS

2012/0224714 A1* 9/2012 Couse ............... H04R 1/406
                                                     381/92
2020/0274911 A1* 8/2020 Gargaro ............. G10L 25/60

OTHER PUBLICATIONS

"Method and System for Dynamically Turning On/Off Microphones Associated with One or More Participants of a Conference Meeting", An IP.com Prior Art Database Technical Disclosure, Disclosed Anonymously, IP.com No. IPCOM000199074D, Electronic Publication Date: Aug. 25, 2010, 2 pages, <https://priorart.ip.com/IPCOM/000199074>.

"Method for detecting co-located devices in a distributed audio system", An IP.com Prior Art Database Technical Disclosure, Disclosed Anonymously, IP.com No. IPCOM000255341D, IP.com Electronic Publication Date: Sep. 18, 2018, 3 pages, <https://priorart.ip.com/IPCOM/000255341>.

"System for automatic switching from mute-unmute mode in telephone/mobile systems", An IP.com Prior Art Database Technical Disclosure, IBM, Original Publication Date: May 5, 2009, IP.com No. IPCOM000182645D, 4 pages, <https://priorart.ip.com/IPCOM/000182645>.

* cited by examiner

USING DATA ANALYSIS TO OPTIMIZE MICROPHONE ENABLEMENT IN A GROUP ELECTRONIC COMMUNICATION

BACKGROUND

The present invention relates generally to the field of network-based teleconferencing, and more specifically, to optimizing microphone enablement for participants in an electronic group meeting.

Teleconferencing is a method of communicating, where multiple participants share input with each other through use of interconnected communication devices such as computers, telephones, or other similar devices each having a microphone or other input components. The communication devices are linked together to form an electronic group and, by the very nature of the meeting, at least some of the meeting participants are in a location remote from other participants.

In some meeting arrangements, multiple participants are located together in a sub-group or cluster, and several distinct clusters may exist. Depending on the nature of the meeting, clusters may include just a few participants (e.g., selected members of a local team) or they may include many participants (e.g., as an audience at a panel discussion); cluster size may vary throughout a given teleconference, and no clusters are required.

The overall arrangement of teleconference participants may include a mixture of participant clusters, as well as remotely located, individual participants, and participants often expect to communicate with each other in a conversational, real-time manner, regardless of participant arrangement.

Some issues with teleconferences include difficulty in hearing the various participants clearly due to connection quality not meeting standards and participants failing to mute their microphones when not actively speaking, causing background noise in the shared audio. Other problems can include resonant feedback, echoes, and other unwanted acoustic when multiple microphones located at one meeting site are activated simultaneously.

SUMMARY

In embodiments according to the present invention, a computer implemented method to optimize input component enablement for several communication devices that each have an input component associated with at least one participant in an electronic group meeting. At least one of the participants is characterized by an identification attribute. A computer identifies a plurality of communication devices that each has an audio input component associated with at least one of a group of meeting participants, and at least one of the meeting participants is characterized by an identification attribute. The computer receives audio input from the one of the input components and measures certain quality-based attributes of the audio input to provide associated quality metrics. The computer uses these metrics to determine whether any of the input exceeds a quality threshold and places microphones providing quality threshold-exceeding input into an active speaking mode. The computer also evaluates audio input content and identifies a concept of focus. The computer then places into an active speaking mode any microphones that are associated with participants having identification attributes that correspond to the identified concept of focus.

In another embodiment of the invention, a system to optimize input component enablement for a plurality of communication devices each having an input component associated with at least one participant in an electronic group meeting, which comprises: a computer system comprising a computer readable storage medium having program instructions embodied therewith. The program instructions are executable by a computer to cause the computer to: identify a plurality of communication devices, each having an audio input component, said audio input components each being associated with at least one of a plurality of a group of participants, wherein at least one of said participants is characterized by an identification attribute; receive an audio input from a first of said audio input components; measure preselected qualitative attributes of said audio input to provide a set of quality metrics; determine whether said set of quality metrics exceeds a threshold for quality; place into an active speaking mode said first audio input component when said set of quality metrics exceeds said threshold for quality; evaluate content of said audio input to identify a concept of focus; place into an active speaking mode any audio input component associated with one of said participants characterized by said identification attribute when said identification attribute corresponds to said identified concept of focus.

In another embodiment of the invention, a computer program product optimizes input component enablement for a plurality of participants in an electronic group meeting. The computer program product comprises a computer readable storage medium having program instructions embodied therewith. The program instructions are executable by a computer to cause the computer to: identify a plurality of communication devices, each having an audio input component, said audio input components each being associated with at least one of a plurality of group participants, wherein at least one of said participants is characterized by an identification attribute; receive an audio input from one of said audio input components; measure content and preselected qualitative attributes of said audio input to provide, respectively, a concept of focus and a set of quality metrics; determine whether said set of quality metrics exceeds a threshold for quality; and place into an active speaking mode any audio input component that is associated with one of said participants having an identification attribute that corresponds to said concept of focus or for which said set of quality metrics exceeds said threshold for quality.

The present disclosure recognizes the shortcomings and problems associated with microphone operation in current teleconferencing systems, especially in network-based conference sessions having participants in a variety of locations, including some locations with multiple, echo-producing input from co-located participants.

In some teleconferences, a meeting leader or moderator directs the discussion to ensure that a meeting agenda is followed or that certain concepts or topics listed in the agenda are discussed. In some settings, subject matter experts may participate in a meeting, and it is important for the input of these participants to be communicated clearly, regardless of their location within the group. In some cases, a meeting may cover a variety of topics, and several experts may be invited to participate in accordance with their area of expertise (which may be indicated in the meeting outline, a resume, or other public source), to ensure at least one expert is present for each of the planned topics of discussion. In those cases, as the topic of conversation changes during the meeting, so may, in accordance with the expert's knowledge of the topic currently being discussed, the moment-to-moment relevance of each expert.

In addition to known subject matter experts, other participants may have personal knowledge of, or may be particularly interested in, the various topics as the meeting progresses. At those times during the meeting, it is important for these participants, who may have points to discuss with a currently-relevant expert or other participant, questions to ask, observations to add, or other timely input to contribute, to be heard clearly, no matter where they are located and regardless of their pre-identified expertise. The meeting environment may also include one or more output components (such as speakers, recorders, close-captioned processors, or similar devices).

According to some embodiments, the electronic meeting includes a several communication devices (e.g., computers, telephones, etc.) joined together for use by a group of meeting participants. Each of the communication devices has a microphone (or similar input component), each of the participants is associated with one of the microphones, and some of the participants are characterized by identification attributes (for example, participant name or subject matter expertise). It is also noted that audio input can include any audio throughput received by the computer, which can include background noise, a participant's voice, and meeting content, as well as audio signal quality assessments.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
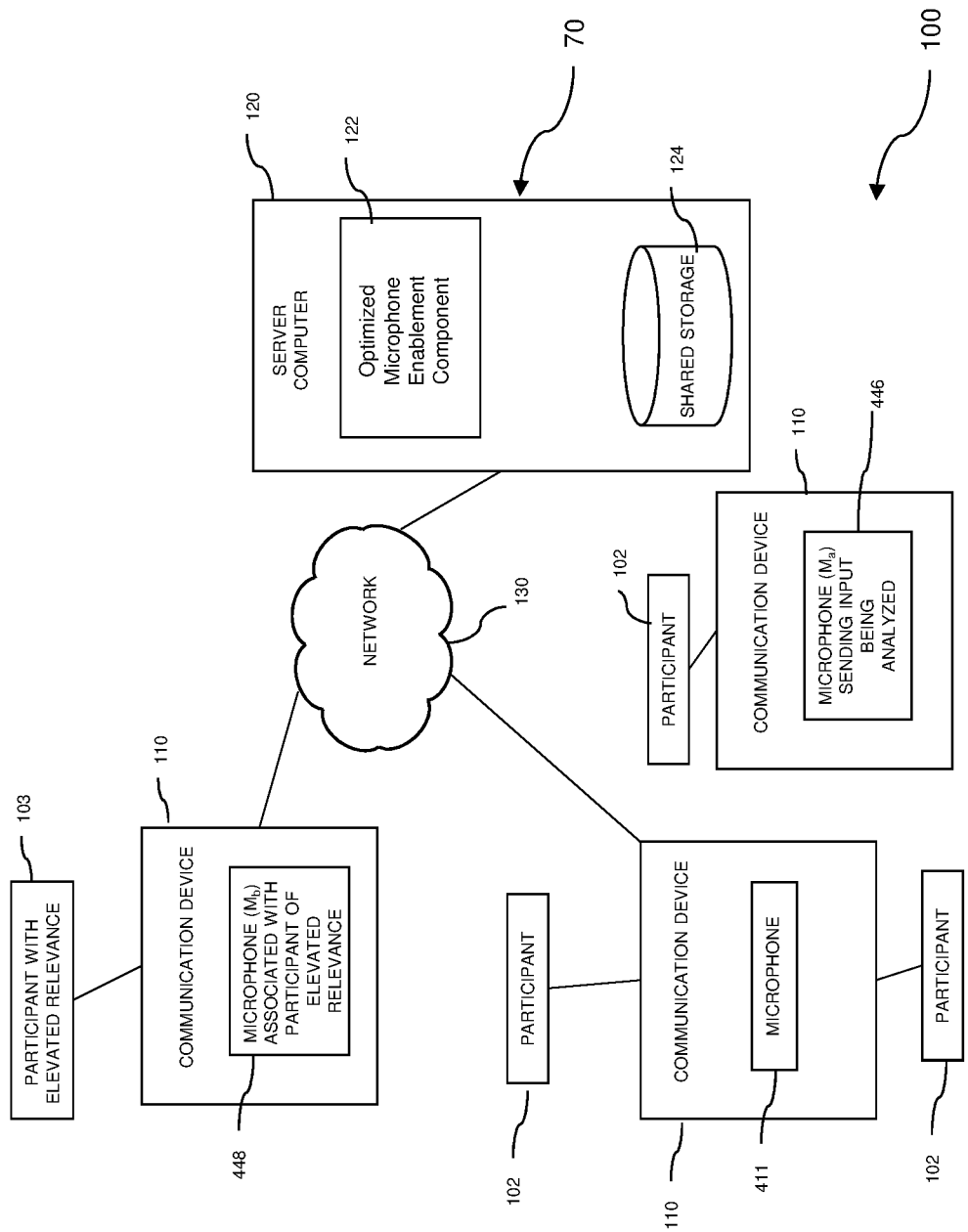
FIG. 1 is a schematic block diagram illustrating an overview of a system for computer-implemented optimization of input component activation in a teleconference according to embodiments of the present invention.
Figure 2:
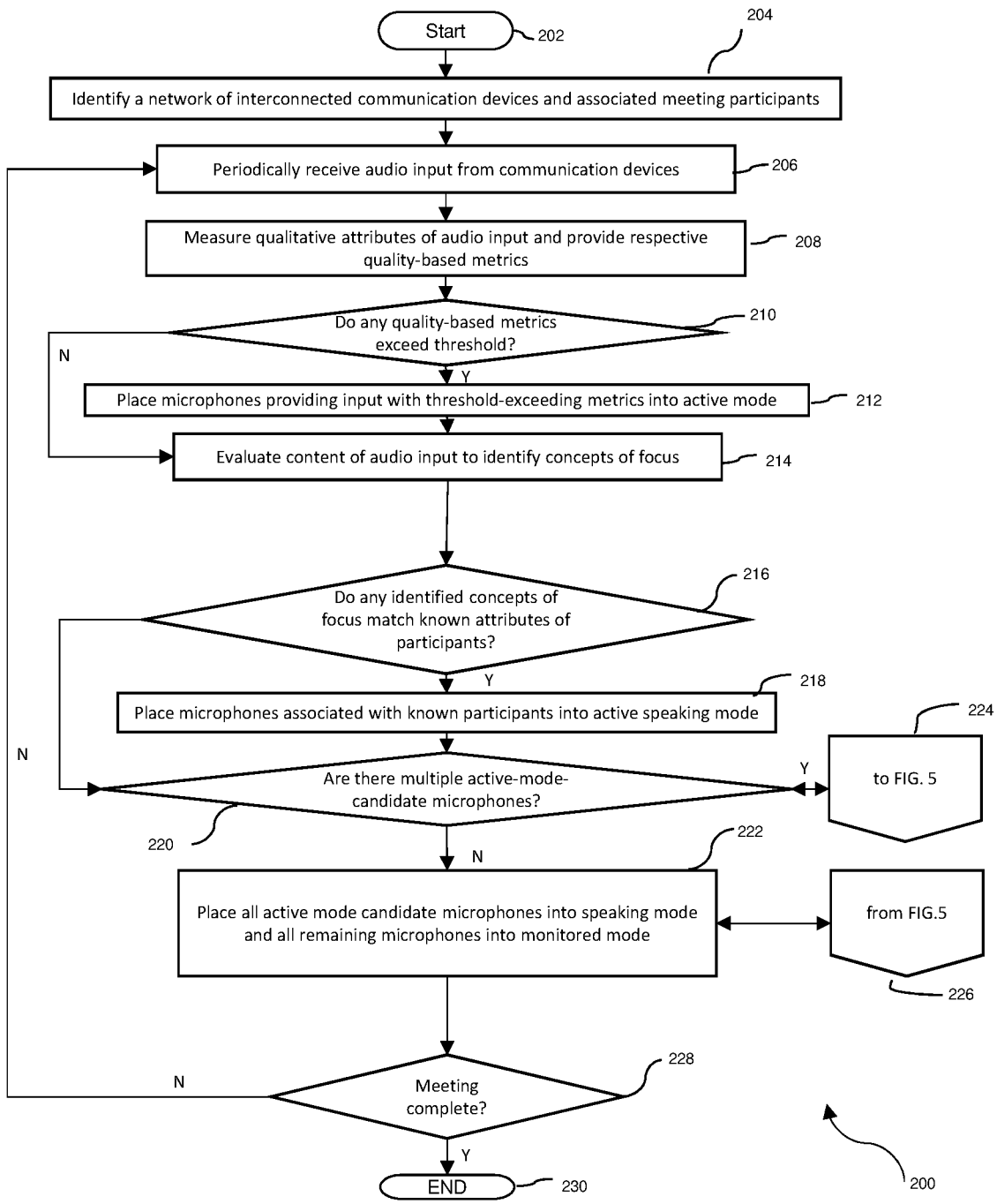
FIG. 2 is a flowchart illustrating a method, implemented using the system shown in FIG. 1, of optimizing audio input component operation during a teleconference according to aspects of the invention.
Figure 4:
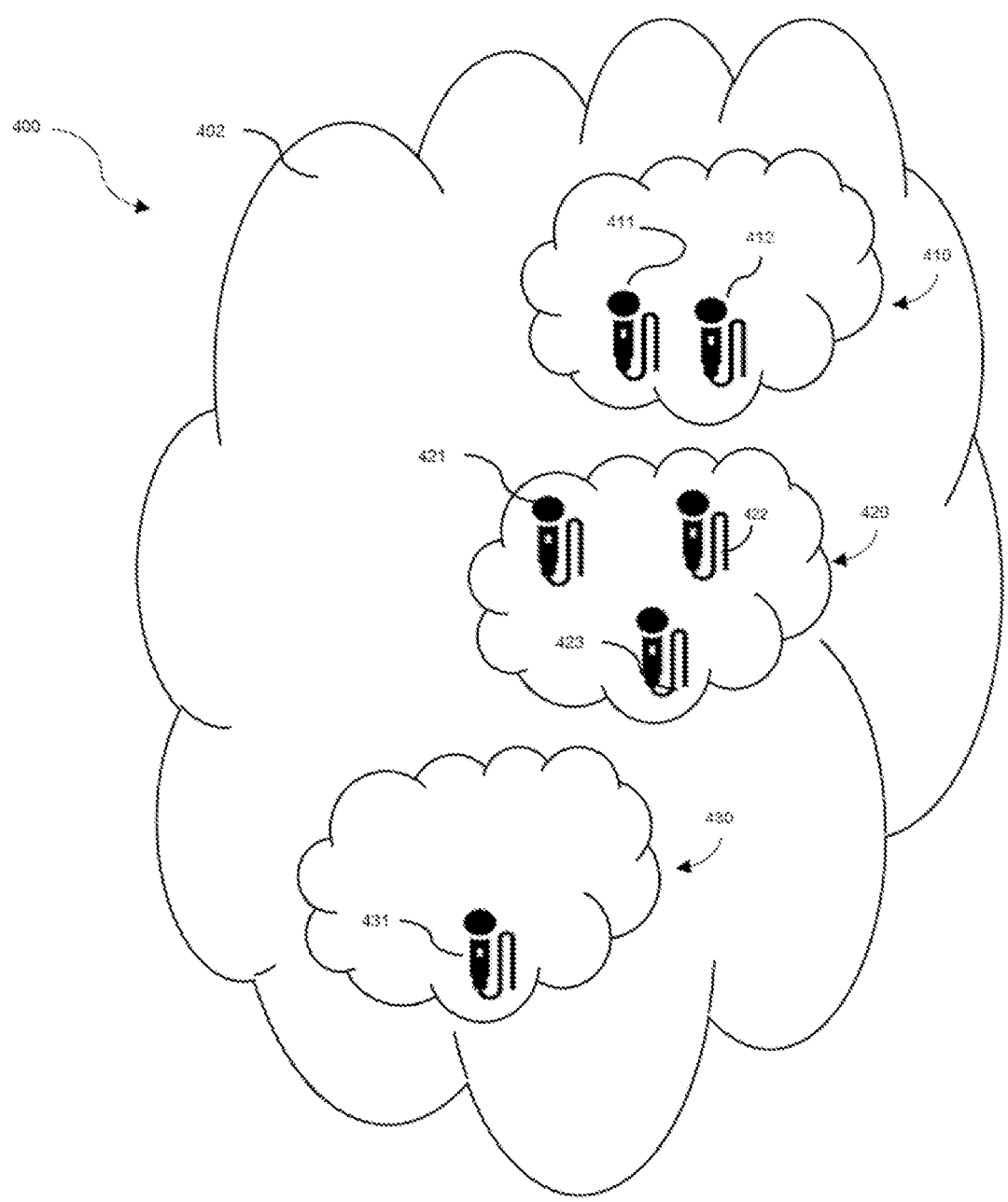
FIG. 4 is a conceptual representation of clusters of communication devices within an electronic meeting according to aspects of the invention.

Now with combined reference to the Figures generally and with particular reference to FIGS. 1, 2, and 4, an overview of a method 200 for optimizing microphone (or similar input component) operation during a teleconference usable within a system 100 as carried out by a server computer 120 having optionally shared storage 124 and aspects 122 that optimize microphone enablement, according to an embodiment of the present disclosure is shown. In one example, each meeting participant 102 is associated with one communication device 110, and each device has an associated input component 411, such as a microphone.

In the present embodiment, two or more communication devices 110 are joined together to form an electronic group 402, whereby teleconference meeting participants can communicate with each other in a real-time manner. Although real-time communication is preferred, it is possible that communication delays may occur, such as if content of the conversation is stored and played at a later time, if the transmission is translated into a different language, or if the input is transferred into different format (e.g., a written transcript, closed-captioned text, etc.). It is also noted that although the term microphone is used as an example of a suitable input component 411, these components need not be microphones, and they need not be standalone devices. In fact the input components used by a group of participants contemplated by the present embodiment could include a mix of standalone devices, as well as those integrated into other devices, including phones (e.g., landline phones, cellphones, VoIP terminals, etc.) and computers (e.g., tablets, desktop computers, laptop computers, etc.); it could be either a standalone item, or other audio input device, for participants in an electronic teleconference.

Now with reference to FIG. 2, according to aspects of the present invention at block 204, a network of communication devices 110 joined to form an electronic group 402 is identified by a server computer 120.

At block 206, the server computer 120 periodically receives input from participants using microphones (or other input components) 411,412, 421, 422, 423, and 431 associated with communication devices 110. It is noted that the term, "microphone" is used for convenience, and that other input components deemed appropriate by one skilled in the art may also be used to provide audio input from the participants.

As noted in block 208, the server computer 120, measures qualitative attributes of the audio input from the microphones 411,412, 421, 422, 423, and 431, respectively, and provides corresponding quality-based metrics for each of the audio inputs.

At block 210, the server computer 120 determines whether any of the quality-based metrics (described more fully below) measured for the audio input exceeds a threshold for quality. At block 212, the server computer 120 labels as an active mode candidate any microphone 411,412, 421, 422, 423, and 431 that provides an input with a measured metric that exceeds a threshold for quality.

At block 214, the server computer 120 evaluates the content of the received audio input to identify any current concepts of meeting focus (described more fully below) for the teleconference. At block 216, the server computer 120 determines whether any identified concepts of focus match known attributes of meeting participants. According to aspects of this invention, some participants are characterized by known identification attributes (e.g., participant name or status as a subject matter expert), and an elevated relevance determination occurs when participant identification attributes match the current concept of focus. In some aspects of this invention, microphones associated with participants of elevated relevance are placed into an active speaking mode.

At block 218, the server computer 120 labels as an active mode candidate any microphone 411,412, 421, 422, 423, and 431 providing an input associated with at least one participant having known attributes that match identified concepts of focus. During some periods of a meeting, the participants may be discussing matters of a general nature instead of topical content, and the concept of focus identified during those periods may be such that any or all participants may be deemed to have elevated relevance (for example, during periods general discussion, the topic or concept of focus may be deemed to be generic concepts or miscellaneous matters and all meeting participants may be deemed to have elevated relevance). It is also possible for a meeting to occur where no participants have an elevated relevance for some topics.

At block 220, the server computer 120 determines whether multiple microphones are labeled as active mode candidates. If there are multiple active mode candidates microphones, the server computer 120 preferably then, as shown more particularly in FIG. 5, identifies a favored input from each of possibly-several clusters 410, 420, and 430 of communication devices 110, within the overall electronic group 402 in the current meeting 400, as shown generally in FIG. 4. The active mode candidate status of each input component 110 providing a favored input is maintained, and the status of any remaining, non-favored active mode candidates is switched to a passive, monitored mode candidate status.

At block 222, the server computer 120 places all active mode candidate microphones into an active speaking mode and all remaining microphones (including active mode candidates that were recently assigned passive, monitored mode candidate status) into a passive, monitored mode.

At block 224, the server computer 120 assesses whether the meeting is completed and, in accordance with the assessment, either terminates the meeting or receives more input.

Figure 3:
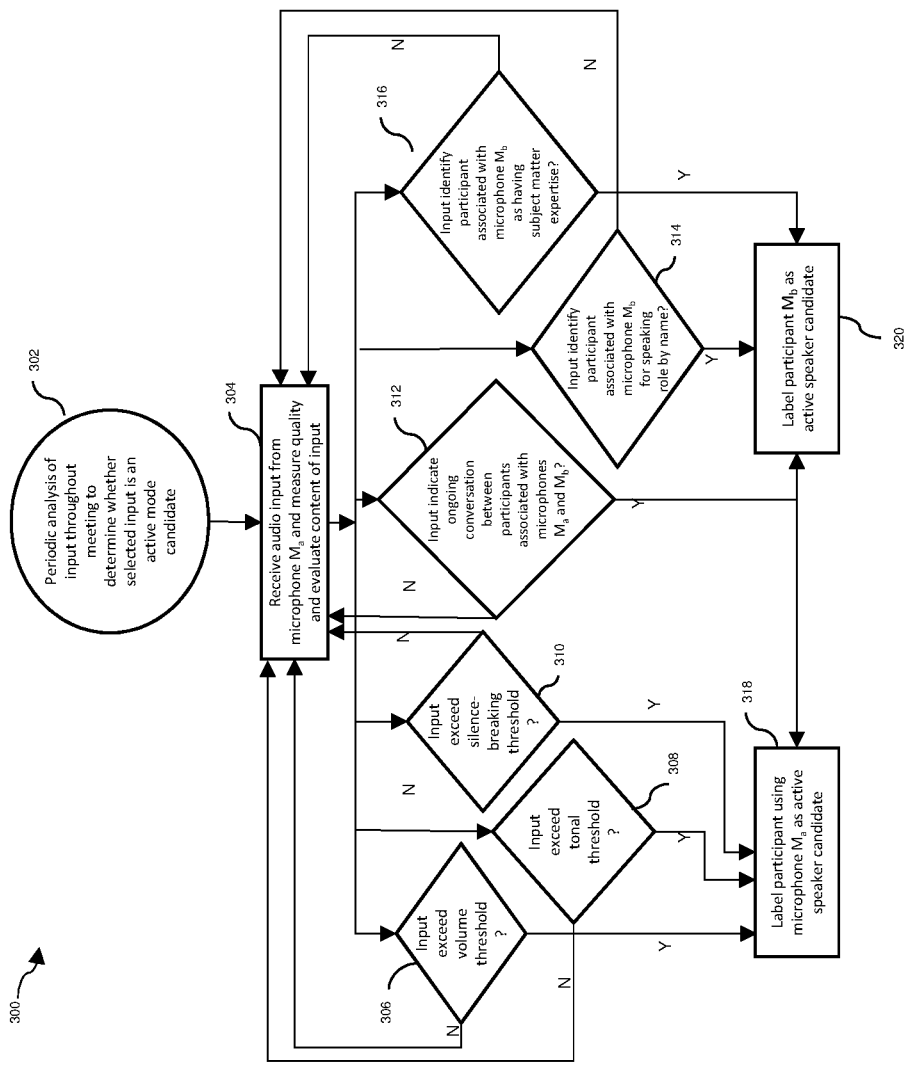
FIG. 3 is a flowchart depicting a logic flow for determining active mode candidate input components aspects of the invention according to aspects of the invention.

As discussed above and as shown in FIG. 2, the server computer 120 periodically receives (at block 206) input from microphones belonging to or associated with participants, with the sever computer analyzing the quality and content (blocks 208 and 214, respectively) of the inputs to determine which of the microphones 411, 412, 421, 422, 423, and 431 providing the inputs are proper candidates for active mode status. With continuing reference FIG. 2 and with additional reference to FIG. 3, the overall logic flow 300 of this analysis and determination will now be described in more detail. It should be noted that the server computer 120 may conduct this active mode candidate analysis in a substantially parallel manner, as shown in FIG. 3. or in a more series-wise, sequential fashion, shown in FIG. 2.

For clarity, and with particular reference to FIG. 1, the following convention will be used to discuss the analysis of a given input: the label $M_a$ will correspond to whichever microphone 446 is providing the input being analyzed, and $M_b$ will correspond to a microphone 448 associated with a participant 103 identified as having elevated meeting relevance. It is noted that for portions of some meetings, $M_a$ and $M_b$ correspond to the same microphone. In aspects of the invention, some or all participants are characterized by identification attributes (including concepts such as the participant's name, topical interests, subject matter expertise, etc.), and a determination regarding participant relevance may be made throughout the meeting by comparing known participant identification attributes with concepts of meeting focus identified by evaluating the content of audio input (such as through natural language processing or other known methods of analyzing and evaluating audio input content) and looking for matches (for example, participant identification attributes that correspond to the current concept of focus). When a current concept of meeting focus is identified (for example, a participant's name or a particular topic) that matches an identification attribute of a given participant (e.g., participant name or topical interest), the microphone $M_b$ 448 associated with that participant 103 is a candidate for being placed into an active speaking mode. By way of overview, at blocks 306, 308, and 310, the server computer 120 measures preselected qualitative attributes and provides corresponding quality-based metrics. As noted above, input quality metrics are considered (conceptually shown in FIG. 2 at blocks 208, 210, and 212) by the server computer 120 to determine which microphones to put into active mode candidate status; this determination will now be discussed more fully with continued reference to FIG. 3.

At block 306, the server computer 120 measures the volume of the input provided by microphone $M_a$. If volume of the analyzed input from $M_a$ exceeds a desired volume threshold, such as 50 dB, then the server computer 120 will label $M_a$ as an active mode candidate microphone. It is noted that 50 dB is the selected threshold volume level, because 60 dB is the nominal volume of conversational speech; applying active mode candidate status only to microphones providing inputs with volume above 50 dB includes input from participants with slightly lower-than-normal speaking voice volumes, while substantially eliminating inputs beyond even typical low-speaking voice volumes. The threshold value for volume could be varied according to the needs and judgment of one skilled in the art.

At block 308, the server computer 120 measures the timbre (also known as tone color or tone quality) of an input from microphone $M_a$. For example, various timbre values, (as found for example, by applying known FTT algorithms to audio input) can be associated with meeting participants tracked throughout the meeting to help identify when a given participant is speaking. This timbre tracking is useful, for example, determining that tracked participants are providing ongoing input, so that a microphone associated $M_a$ with that participant can be labelled with a matching rating factor to be considered when placing microphones into an active speaking mode. Although tone is measured in the manner described above, other known tonal attributes may be used by those skilled in the art to recognize the input of particular participants and to attribute active mode candidate status accordingly.

At block 310, the server computer 120 measures whether the input provided by microphone $M_a$ 446 is breaking a period of sustained silence or speaking over an existing, monotonic input. If the current measured volume of the input from microphone $M_a$ exceeds the average volume for the previous 15 seconds [Question for inventors: is this how you would indicate silence breaking] by a more than 15 dB, then the server computer 120 at block 318 will label $M_a$ as an active mode candidate microphone. It is noted that a volume change of more than 15 dB is the selected to indicate a departure from a droning input that might be present if a participant 102 is in an environment with consistent background noise. In such a case, the sudden change in volume level could indicate a participant 102 is beginning to speak, thereby increasing the volume of the input beyond the drone previously present. Adjustments to the threshold value for volume change could be programmed into the sever computer 120 according to the needs and judgment of one skilled in the art.

It is noted that a microphone $M_a$ 446 associated with a given analyzed audio input might be labelled as an active mode microphone by exceeding just one—or several—quality thresholds during a given analysis cycle. Once active mode status characterization is complete for a given input, the periodic analysis may repeat, with the server computer 120 receiving another input at block 304 and conducting another round of quality and content-based analysis. It is also noted that microphones meeting criteria to qualify as active mode candidate microphones may be placed into an active mode without first being labeled as an active mode candidate.

By way of additional overview, at blocks 312, 314, and 316, the server computer 120 evaluates the input content to determine whether the identifies any concepts of focus having current importance to the meeting. As noted above, evaluated content (conceptually shown in FIG. 2 at blocks 214, 216, and 218) is considered by the server computer 120 to determine which microphones to put into active mode candidate status; this determination will now be discussed more fully with continued reference to FIG. 3.

For continued clarity, the convention regarding labels $M_a$ and $M_b$ will again be followed, $M_a$ corresponding to whichever microphone 446 is providing the input being analyzed, and with $M_b$ corresponding to a microphone 448 associated with a participant 103 identified as having elevated meeting relevance. It is noted still that for portions of some meetings, $M_a$ and $M_b$ may correspond to the same microphone.

In the present embodiment, content evaluation can be conducted through natural language assessment, considering the words, context, and other linguistic aspects of the input content, to glean the overall message contained in the input received by the server computer 120. Output for this analysis could include various concepts of focus, including topics or subject matter currently being discussed by the participants, whether certain participants are having a discussion, and names of participants spoken by one or more participants as an explicit speaker hook or indication that a certain named participant should speak. In this way, aspects of the embodiment identify participants 103 having elevated relevance; other approaches may also be used, and several are described below.

It is noted that although preferred, natural language analysis isn't required, as the server computer 120 could instead parse the input for known commands phrases and the names of key participants, using those phrases and names to identify a set of predefined concepts of focus, using these concepts to indicate that certain topics or participants have elevated relevance. Other teleconference-relevant target words could be identified by one skilled in the art and programmed into the analysis logic employed by the server computer 120, for example in the optimized microphone enablement component 122.

With specific reference to block 312, output from the analysis described above may indicate that multiple participants are engaged in a discussion. If such a determination is made, the sever computer 120 identifies each participant 103 in the discussion as having elevated relevance or importance, and at block 320, labels the microphones 448 $M_b$ associated with those participants as active mode candidate microphones.

With specific reference to block 314, output from the analysis described above may indicate that a certain participant 103 has been named by himself or hooked by another participant as a speaker who should provide input at that point in the teleconference, providing yet another way to identify participants having elevated relevance. If such a determination is made, the server computer 120 identifies each participant 103 so named or hooked as having elevated importance, and at block 320, labels the microphones 448 $M_b$ associated with those participants as active mode candidate microphones.

With specific reference to block 316, output from the analysis described above may indicate that a certain participant 103 is subject matter expert or otherwise a speaker who should provide input at that point in the teleconference, thereby indicating that such participants have elevated relevance. Such a determination can be made by matching known attributes about a participant 103 (such attributes may include publicly-known aspects like public newsfeeds or social media entries, items listed on a public resume, or other publicly-known details of the speaker's qualifications; they may also, with the speaker's permission, non-public information provided by the participant) with identified concepts of focus. If such a determination is made, the server computer 120 identifies each participant 103 having known attributes that match identified concepts of focus as having elevated relevance, and at block 320, labels the microphones $M_b$ associated with those participants as active mode candidate microphones.

It is noted that input content evaluation might indicate the microphones $M_a$ and $M_b$ associated with a given input and with an identified participant, respectively, might be labelled as an active mode microphone for just one reason—or several reasons—during a given content analysis cycle. Once active mode status characterization is complete for a given input, the periodic analysis may repeat, with the server computer 120 receiving another input at block 304 and conducting another round of quality and content-based input analysis. It is also noted that an input may qualify for active mode status by meeting a quality threshold and by being associated with participants having elevated relevance; these status qualifications may be present simultaneously or independently. It is also noted that due to various weighting factors (shown, for example, in FIG. 6), microphones for a participant of elevated relevance 103 (such as a highly-weighted meeting leader) might be activated even if the microphone $M_b$ 448 associated with that participant does not exceed a threshold for quality.

It is also contemplated that a given audio input component may be placed into an active speaking mode when it provides an input having quality metrics that exceed the quality thresholds described herein (or other thresholds selected by one skilled in the art) or when it is associated with a participant 102 having elevated meeting relevance. A given audio input component may also be placed in an active speaking mode when it both provides an input having quality metrics that exceed the quality thresholds described herein (or other thresholds selected by one skilled in the art) and is also associated with a participant 102 having elevated meeting relevance.

It is noted that active mode candidate status for each microphone could change as the meeting progresses, and that any number of participants could have this status at any given time. Due to the variable nature of attendance and teleconference logistics, the physical location of meeting participants may vary from meeting to meeting, as well as during a given meeting. Invited participants may join a meeting from multiple locations, and with portable communication devices being commonplace, participants may even change location during a given meeting. It is typically expected that, regardless of location, all participants should be able to participate meaningfully and flexibly throughout the meeting.

In some cases, it is acceptable to have all active mode candidates placed in an active speaking mode concurrently. This is most typically permitted when individual active mode candidate participants are physically at different locations. However, in some meeting arrangements, several participants may be together at one location, and this can introduce complications if microphones for multiple co-located participants are placed in an active speaking concurrently.

With reference to FIG. 4, a schematic representation of a meeting arrangement 400 with co-located participants is shown. FIG. 4 includes an overall collection 402 of participants grouped into several clusters 410, 420, and 430. Some groups, like cluster 410 may have two participants and corresponding microphones 411, 412. Other groups, like cluster 420 may have more than two participants and corresponding microphones 421, 422, and 423. Still other groups, like cluster 430 may have only one participant 102 and corresponding microphone 431. If multiple microphones located within a cluster of co-located participants are placed in an active speaking mode, it is likely that unwanted feedback will be introduced into the conversation.

To avoid this, the server computer 120 of the system may, as will now be discussed with additional reference to FIGS. 2 and 5, process input in a manner that avoids this. As shown at block 220 of FIG. 2, the server computer 120 will determine whether multiple microphones have been labelled as active mode candidate microphones, and several have, the server computer will, by passing from block 224 of FIG. 2 to block 502 of FIG. 5.

Figure 5:
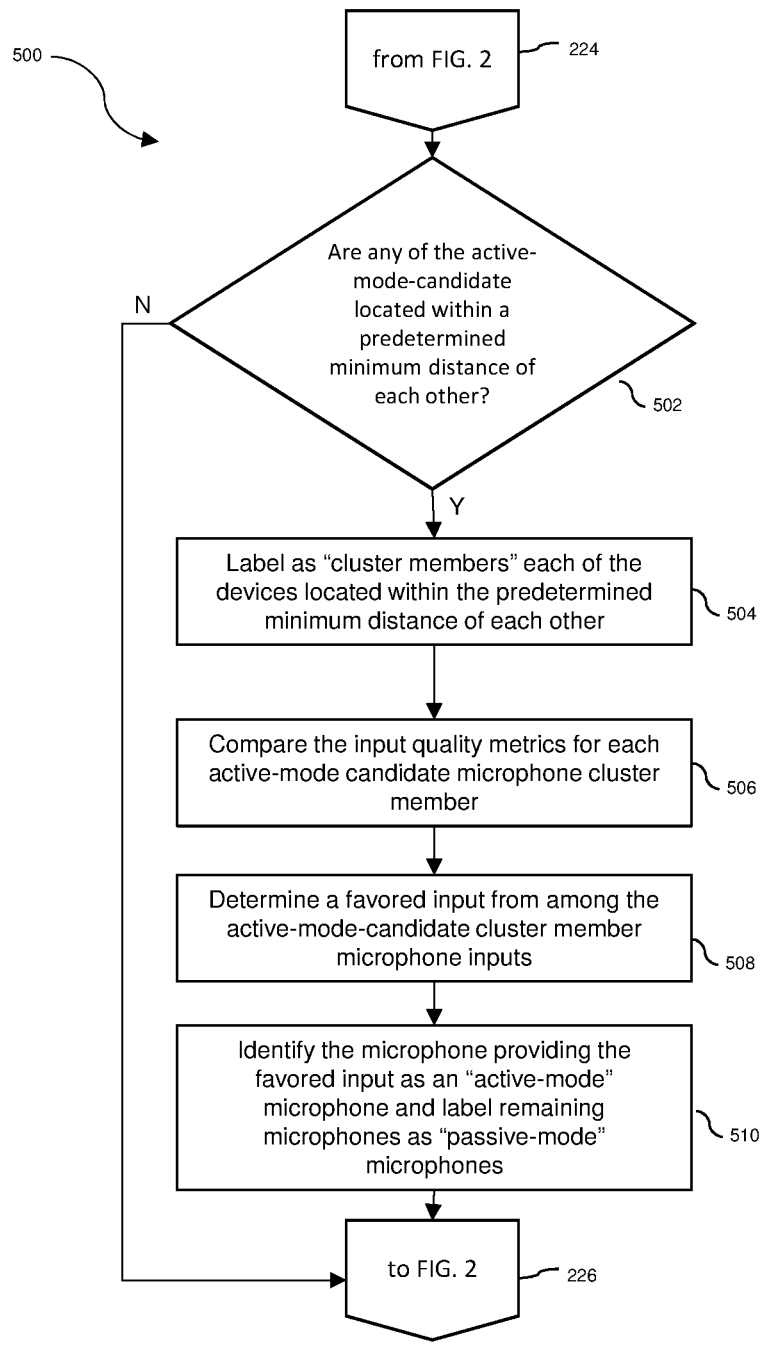
FIG. 5 is a flowchart depicting a logic flow to select a favored input from within a cluster of participants according to aspects of the invention.

With reference now to FIG. 5, a logic flow 500 to avoid unwanted feedback in a teleconference according to aspects of the present embodiment is shown. As noted above, when the server computer 120 identifies at block 220 that more than one microphone has been concurrently labelled as an active mode candidate microphone, the server will computer will, at block 502 determine whether any active mode candidate microphones is located within a predetermined distance each other. Typically, the predetermined distance is less than 15 feet, but this distance can vary depending on several factors, including microphone sensitivity and location acoustics. Accordingly, the predetermined distance value may be programmed into the server computer 120 in accordance with judgment and needs of the one skilled in the art.

At block 504, all active candidate microphones located within the predetermined distance of each other are grouped together as a cluster. There may be several clusters 410, 420, and 430 as shown in FIG. 4.

Figure 6:
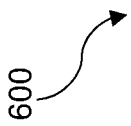
FIG. 6 is a table showing an example of relative importance weighting for various input attributes usable to determine a favored input within a cluster of devices.

At block 506, the quality metrics for each active-mode candidate microphone member of the various clusters 410, 420, and 430 are compared to determine—at block 508—a favored active mode candidate for each cluster. A weighted attribute table 600 such as the one shown in FIG. 6 may be used to determine which input is favored in a cluster. As shown in FIG. 6, the various attributes are valued differently, so that microphones which are active modes candidates for different reasons may be strategically selected. For example, if a microphone is an active mode candidate because of passing the volume threshold, it would not be favored over input that was an active mode candidate because of being identified as a subject matter expert. Other various factor weights as shown, and the relative weights can be adjusted as and programmed into the server computer 120 in accordance with a strategy meeting the needs and judgment of one skilled in the art. With the arrangement shown, it is possible to ensure named participants or subject matter experts are valued more highly than those participants who merely have a loud or clear input. As discussed above, it is noted that a microphone may be an active candidate for one or several reasons. As such microphones corresponding to participants $M_a$ that are loud, clear, and participating in a conversation may be favored over microphones corresponding to participants who have been identified by name but who are not speaking. Alternatively, additional weight (and possibly subsequent input processing using techniques known by those skilled in the art to improve sound quality) may be applied to input from microphones $M_b$ of subject matter experts who are known to be soft-spoken (or to a moderator who is suffering from a cold and has difficulty being heard) to ensure these important participants are heard during the teleconference. Various combinations of factor weights may be programmed into the server computer to ensure the proper profile of favoring from among cluster members is achieved.

At block 510, once cluster favored microphones are identified, their active candidate mode status is maintained, the status of each remaining, non-favored active mode candidate microphones is shifted to a passive, monitored mode, and the sever logic flow returns from FIG. 5 to block 226 of FIG. 2.

This periodic repetition allows for dynamic clusters, where participants may use a combination of fixed location and portable communication devices during a meeting, if necessary. This would allow participants to join a meeting on a portable device, for example while driving to a meeting location, and the then to join the meeting on an existing computer or telephone located at the meeting venue.

It is noted that at block 502 it may be determined that some clusters (like cluster 430) may have only one member and that in those cases, the one microphone is the de facto favored microphone until another participant joins the cluster, and the logic flow goes straight to the bottom of FIG. 5 where it rejoins the remaining logic flow shown in block 226 of FIG. 2.

Figure 7:
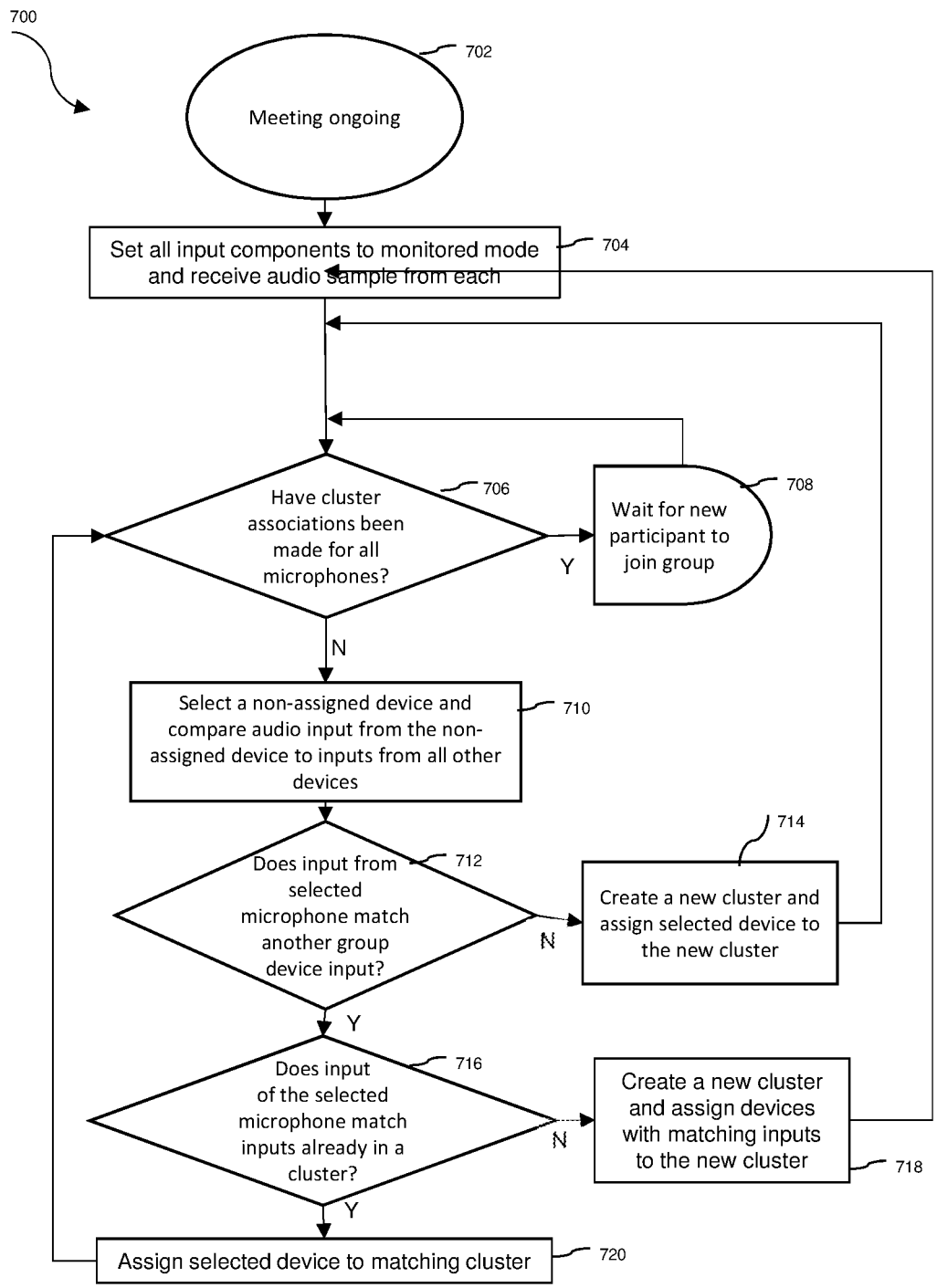
FIG. 7 is a flowchart depicting a logic flow to identify multiple clusters of participants according to aspects of the invention.

Alternatively, the determination of whether active mode candidates are too close to be activated simultaneously may be made by the server computer 120 in accordance with analysis logic 700 shown in FIG. 7.

At block 704, all participant microphones are set to a passive, monitored mode and the server computer receives an input from each microphone.

At block 706, the server computer 120 determines whether a cluster assignment has been made for each microphone. If all microphones have a cluster assignment, then the logic flow travels to block 708 to wait for additional microphones to join the electronic group 402.

If all microphones do not have cluster assignments, then at block 710, the server computer 120 selects one of the non-assigned microphones and compares the input selected to inputs from all other microphones.

At block 712, the server computer 120 determines whether the selected input matches the input from any other microphone. If no match is made, the server computer 120 assigns the selected microphone, in block 714, to a new cluster, and the flow logic returns to block 706.

If input matches are identified in block 712, then the server computer 120 determines, at block 716, whether the selected input matches input from a microphone already assigned to a cluster.

At block 716, if the matching input belongs to a microphone not already in a cluster, then server computer 120 assigns the microphones providing the matching input to a new cluster, and flow logic returns to block 706.

At block 716, if the matching input belongs to a microphone already in a cluster, the server computer 120, at block 720, assigns the microphone providing the selected input to the cluster of the microphone providing the matching input, and flow logic returns to block 706.

It is also noted that the entire set (and various subsets) of audio input components may be placed collectively into muted, active speaking mode, or passive modes as needed at various times during a given meeting to improve acoustics, meeting input transmission, or to otherwise improve the participant experience.

Audio input components might be placed into an active mode under a variety of conditions. For example, in addition to exceeding a threshold of quality, some input sources (e.g., a meeting leader) may be deemed so important that input from them will trigger associated microphone activation, even if the input is low quality. This will allow for situations where, for example, a leader has moved away from his assigned microphone to facilitate discussion from a location far from all microphones, for example to attend to administrative aspects of the meeting, to lead a discussion of general topics, or to assist with meeting location site logistics, while still needing access to an active microphone to effectively direct the meeting.

As discussed herein, it is understood that the evaluation of input content to identify concepts of focus refers to application of techniques such as natural language processing (or other techniques known by those skilled in the art) to determine trends or topics currently relevant to the meeting. These concepts often include a named participant or a specific topic of discussion. It is possible that, for some phases in a meeting, the identified concept of focus will indicate that only general matters are being discussed. At those times, it is also possible that no input exceeding a threshold of quality is being received. In such case, the computer might simply place all microphones in a passive, monitored mode. Alternatively, some meeting setting may have large periods of general discussion with no specific topics being discussed and with no high-quality audio input; in those instances, having the computer proactively place multiple microphones (for example, either all microphones or all microphones providing favored inputs within various meeting clusters) may be more appropriate. Certain aspects of this embodiment provide guidance for selecting a favored input from among several.

As seen in FIG. 6, various rating factors of evaluated audio input are provided to indicate a way to show the overall relative importance of certain input attributes. More particularly, audio input from a microphone associated with the meeting leader is given a factor of 10, audio input from a microphone associated with a named participant is given a factor of 9, audio input from a microphone associated with a participant having subject matter expertise corresponding to a current concept of focus is given a factor of 8, audio input from microphones associated with participants having an ongoing discussion is given a factor of 7, audio input from microphones associated with participants providing continuous input is given a factor of 6, audio input from microphones associated with participants breaking a period of extended silence are given a factor of 5, audio input exceeding a threshold for tonal quality is given a factor of 4, audio input exceeding a threshold for volume is given a factor of 3, input of low quality (e.g., not exceeding a threshold for quality) is given a factor of 1. These factors may be combined for a given input, and higher sums would tend to indicate more-favored inputs. Different factor values could be assigned as needed to account for differences in input importance for different meeting dynamics.

According to aspects of this embodiment, audio input component activation may occur directly upon determining that a set of input quality attributes (including volume and tonal quality) and providing a exceeds a threshold of quality metrics. In other aspects of this invention, activation methods may also involve a multi-step process, where audio input content is evaluated through methods such as natural language processing (or other appropriate methods known those skilled in the art) to determine a current concept of focus and microphones associated with participants having elevated relevance (e.g., identification attributes that correspond to the current concept of focus) are activated.

According to aspects of this embodiment, complimentary assessment modes are described: assessments regarding qualities of audio inputs received and assessments related to content of audio inputs received. Assessed input qualities may include volume sufficiency, tonal clarity, and input source. Assessing input content includes determining focus concepts and finding meeting participants with identification attributes (e.g., participant name or topical expertise) that correspond to those concepts.

Concepts of focus are not only topical; concepts of focus may simply be an identification of a situation within the meeting for which microphone activation is desired. Such situations include, but are not limited to, receiving input from a participant breaking extended silence, ongoing input from a single participant, and ongoing discussion between several participants. Concepts of focus will often vary throughout a meeting, with concepts of focus often including participant names and topics related to participating subject matter experts.

It is also noted that during times when no input exceeds a threshold of quality, all microphones may all be placed into a passive monitored mode. Alternatively, input rating factors described elsewhere may be used to determine a favored input or several inputs meeting to be activated, thereby allowing moments of low-quality input to still provide topical-relevant discussion.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
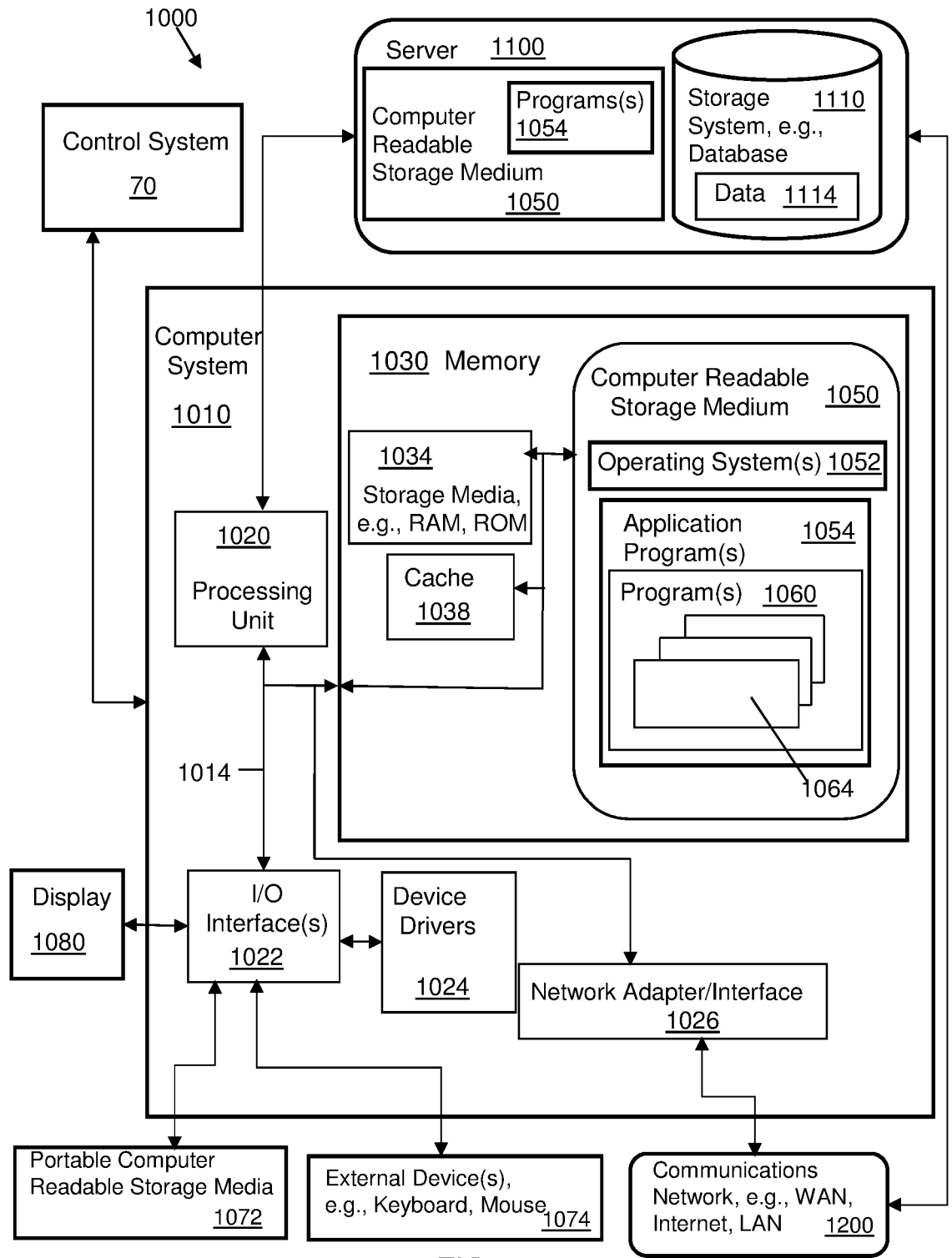
FIG. 8 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 8, a system or computer environment 1000 includes a computer diagram 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the one or more communication devices 110 shown in FIG. 1 similarly can include all or part of the computer system 1010 and its components, and/or the communication devices can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
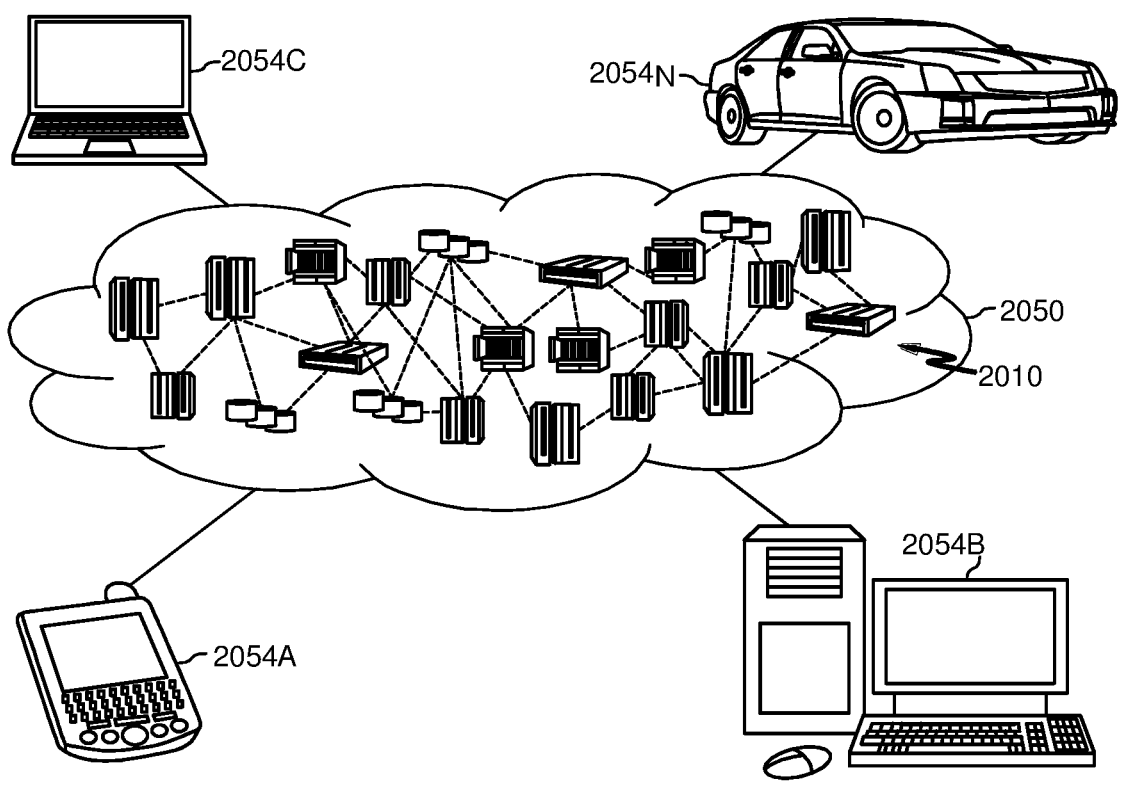
FIG. 9 depicts a cloud computing environment according to an embodiment of the present invention.

Referring now to FIG. 9, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 10:
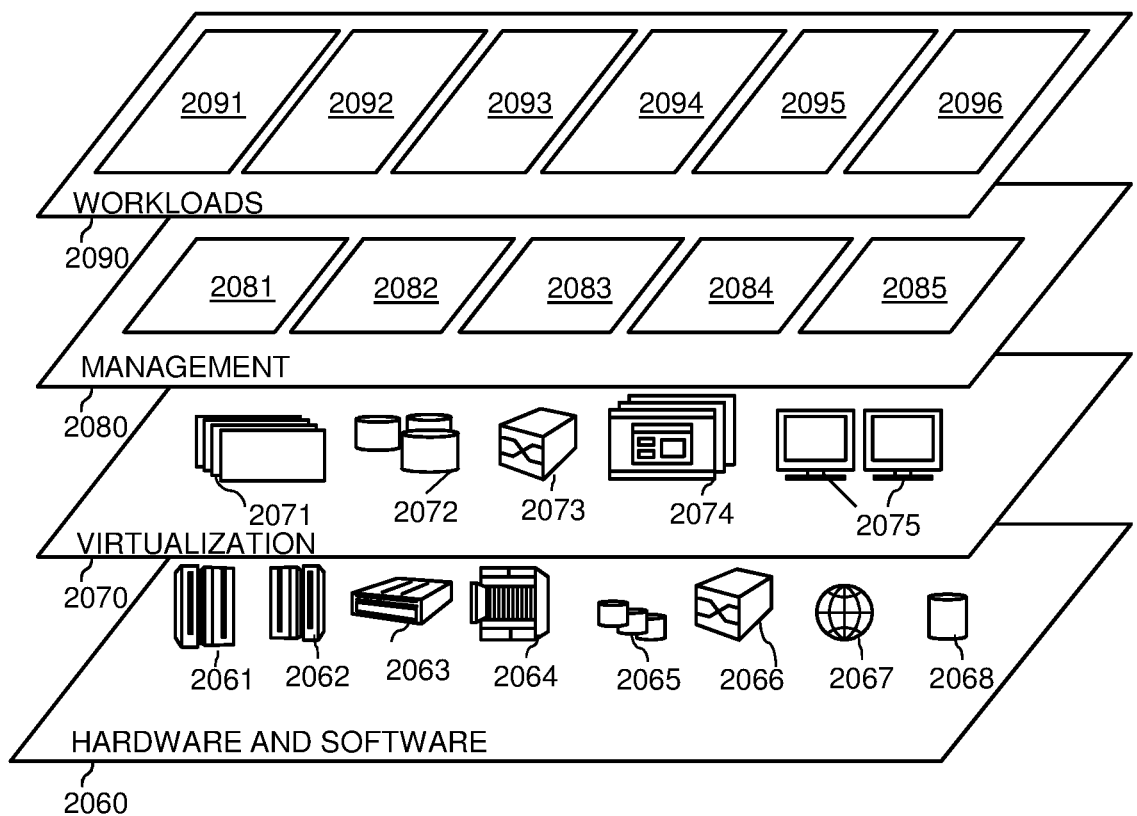
FIG. 10 depicts abstraction model layers according to an embodiment of the present invention.

Referring now to FIG. 10, a set of functional abstraction layers provided by cloud computing environment 2050 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include mapping and navigation 2091; software development and lifecycle management 2092; virtual classroom education delivery 2093; data analytics processing 2094; transaction processing 2095; and optimizing microphone enablement in group electronic communication using data analysis 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to optimize input component enablement for a plurality of communication devices each having an input component associated with at least one participant in an electronic group meeting, comprising:
    identifying, by a computer, a plurality of communication devices, each having an audio input component, said audio input components each being associated with at least one participant of a group of participants, and at least one of said participants is characterized by an identification attribute;
    receiving, by said computer, audio input from a first of said audio input components;
    measuring, by said computer, preselected qualitative attributes content derived from said audio input to provide a set of quality metrics;
    determining, by said computer, whether said set of quality metrics exceeds a threshold for quality;
    placing into an active speaking mode, by said computer, said first audio input component when said set of quality metrics exceeds said threshold for quality;
    evaluating, by said computer, content of said audio input to identify a concept of focus; and
    placing into an active speaking mode, by said computer, any audio input component associated with one of said participants characterized by said identification attribute when said identification attribute corresponds to said identified concept of focus.

2. The computer implemented method of claim 1, further comprising:
    identifying, by a computer, a plurality of communication devices, each having an audio input component, said audio input components each being associated with at least one participant of a group of participants, and at least one of said participants is characterized by an identification attribute;
    receiving, by said computer, a plurality of audio inputs, each from one of a plurality of said audio input components;
    measuring, by said computer, preselected qualitative attributes of each of said plurality of audio inputs to provide a sets of quality metrics for each of said plurality of audio inputs;
    determining, by said computer, whether any of said plurality of said sets of quality metrics exceeds a threshold for quality;
    placing into an active speaking mode, by said computer, each of said plurality of said audio input components when said set of quality metrics for said each of said plurality of input components exceeds said threshold for quality;
    evaluating, by said computer, content of each of said plurality of audio inputs to identify a concept of focus; and
    placing into an active speaking mode, by said computer, any of said plurality of audio input components associated with one of said participants characterized by said identification attribute when said identification attribute corresponds to said identified concept of focus.

3. The computer implemented method of claim 2, further comprising:
    determining, by said computer, whether said plurality of input components in said active speaking mode are physically separated by a minimum distance;
    labeling as a first member of a cluster, by said computer, a first of said plurality of input components in said active speaking mode;
    selectively labelling as a second member of said cluster, by said computer, a second of said plurality of input component in said active speaking mode, in accordance with said minimum distance determination;
    determining, by said computer, a favored input component from among all input component cluster members in said active speaking mode; and
    maintaining, by said computer, said favored input component in said active speaking mode and placing, by said computer, all remaining input component cluster members into a monitored mode.

4. The computer-implemented method of claim 1, wherein said set of quality metrics is selected from the group consisting of absolute volume level, volume level change, clarity, cadence, and source.

5. The computer-implemented method of claim 1, wherein said one of said participants characterized by an identification attribute has a name and wherein said name is an identification attribute that corresponds to said identified concept of focus.

6. The computer-implemented method of claim 1, wherein said evaluating of said content-based attributes includes evaluating, by said computer, said first audio input using natural language analysis to identify current meeting topics and comparing, by said computer, said identified current meeting topics with a known attribute associated with specific participants to determine, by said computer, said participants having said elevated relevance.

7. The computer-implemented method of claim 6, wherein said known participant-associated attributes include information in an indexed reference accessed by said computer.

8. The computer-implemented method of claim 6, further including searching, by said computer using natural language analysis, a source of reference material to identify said participant-associated identification attributes.

9. The computer-implemented method of claim 1, further including delivering, by said computer, audio inputs from said input components to at least one output component associated with said network.

10. A system to optimize input component enablement for a plurality of communication devices each having an input component associated with at least one participant in an electronic group meeting, which comprises:
    a computer system comprising a computer readable storage medium having program instructions embodied therewith, the program instructions executable by a computer to cause the computer to:
    identify a plurality of communication devices, each having an audio input component, said audio input components each being associated with at least one of a plurality of a group of participants, wherein at least one of said participants is characterized by an identification attribute;
    receive an audio input from a first of said audio input components;
    measure preselected qualitative attributes of said audio input to provide a set of quality metrics;
    determine whether said set of quality metrics exceeds a threshold for quality;
    place into an active speaking mode said first audio input component when said set of quality metrics exceeds said threshold for quality;

evaluate content of said audio input to identify a concept of focus; and place into an active speaking mode any audio input component associated with one of said participants characterized by said identification attribute when said identification attribute corresponds to said identified concept of focus.

11. The system of claim 10, wherein said program instructions executable by a computer further cause said computer to:

receive a plurality of input components in said active speaking mode;

determine whether said plurality of input components in said active speaking mode are physically separated by a minimum distance;

label as a first member of a cluster a first of said plurality of input components in said active speaking mode;

selectively label as a second member of said cluster a second of said plurality of input component in said active speaking mode, in accordance with said minimum distance determination;

determine a favored input component from among all input component cluster members in said active speaking mode; and maintain said favored input component in said active speaking mode and placing, by said computer, all remaining input component cluster members into a monitored mode.

12. The system of claim 11, wherein said program instructions executable by a computer further cause said computer to:

determine whether said first and second input components are physically separated by a minimum distance;

label said first input component as a first member of a cluster;

selectively label said second input component as a second member of said cluster in accordance with said minimum distance determination;

determine a favored input component from among all input component cluster members in said active speaking mode; and maintain said favored input component in said active speaking mode and placing, by said computer, all remaining input component cluster members into a monitored mode.

13. The system of claim 10, wherein said set of quality metrics is selected from the group consisting of absolute volume level, volume level change, clarity, cadence, and source.

14. The system of claim 10, wherein said program instructions that cause said computer to evaluate said content-based attributes, further include instructions that cause said computer to determine whether said one of said participants characterized by an identification attribute has a name and wherein said name is an identification attribute that corresponds to said identified concept of focus.

15. The system of claim 10, wherein said program instructions that cause said computer to evaluate said content-based attributes further include instructions that cause said computer to evaluate said first audio input using natural language analysis to identify current meeting topics and to compare said identified current meeting topics with a known attribute associated with specific participants to determine said participants having said elevated relevance.

16. The system of claim 15, wherein said program instructions that cause computer to evaluate said known participant-associated attributes further include instructions that cause said computer to access said attributes in an indexed reference.

17. The system of claim 15, further including program instructions that cause said computer to search, using natural language analysis, a source of reference material to identify said participant-associated identification attributes.

18. The system of claim 10, further including program instructions that case said computer to deliver audio input from said input components to at least one output component associated with said network.

19. A computer program product to optimize input component enablement for a plurality of participants in an electronic group meeting, the computer program product comprising a computer readable storage medium having program instructions embodied therewith, the program instructions executable by a computer to cause the computer to:

identify a plurality of communication devices, each having an audio input component, said audio input components each being associated with at least one of a plurality of group participants, wherein at least one of said participants is characterized by an identification attribute;

receive an audio input from one of said audio input components;

measure content and preselected qualitative attributes of said audio input to provide, respectively, a concept of focus and a set of quality metrics;

determine whether said set of quality metrics exceeds a threshold for quality; and place into an active speaking mode any audio input component that is associated with one of said participants having an identification attribute that corresponds to said concept of focus or for which said set of quality metrics exceeds said threshold for quality.

20. The computer program product of claim 19, wherein said program instructions executable by a computer further cause said computer to:

receive a plurality of input components in said active speaking mode;

determine whether said plurality of input components in said active speaking mode are physically separated by a minimum distance;

label as a first member of a cluster a first of said plurality of input components in said active speaking mode;

selectively label as a second member of said cluster a second of said plurality of input component in said active speaking mode, in accordance with said minimum distance determination;

determine a favored input component from among all input component cluster members in said active speaking mode; and maintain said favored input component in said active speaking mode and placing, by said computer, all remaining input component cluster members into a monitored mode.

* * * * *